United States Patent [19]

Liu

[11] Patent Number: 5,877,945
[45] Date of Patent: Mar. 2, 1999

[54] ASYMMETRICAL HALF-BRIDGE CONVERTER HAVING DISTRIBUTED DC BIAS METHOD OF OPERATION THEREOF AND POWER SUPPLY EMPLOYING THE SAME

[75] Inventor: Rui Liu, Plano, Tex.

[73] Assignee: Lucent Technologies Inc., Murray Hill, N.J.

[21] Appl. No.: 932,353

[22] Filed: Sep. 17, 1997

[51] Int. Cl.$^6$ .................................................... H02M 3/335
[52] U.S. Cl. ................................................................ 363/17
[58] Field of Search ................................. 363/16, 17, 98, 363/132

[56] References Cited

U.S. PATENT DOCUMENTS

| | | | |
|---|---|---|---|
| 4,300,191 | 11/1981 | Baranowski et al. | 363/17 |
| 4,860,184 | 8/1989 | Tabisz et al. | 363/17 |
| 4,945,462 | 7/1990 | Lieberman | 363/17 |
| 5,245,520 | 9/1993 | Imbertson | 363/17 |
| 5,351,179 | 9/1994 | Tsai et al. | 363/17 |
| 5,754,413 | 5/1998 | Fraidlin et al. | 363/16 |
| 5,784,266 | 7/1998 | Chen | 363/16 |

OTHER PUBLICATIONS

Paper entitled "Static and Dynamic Characteristics of Zero–Voltage–Switched Half–Bridge Converter with PWM Control" by Tamotsu Ninomiya, Norio Matsumoto, Masatoshi Nakahara, Koosuke Harada; IEICE Transactions, Dec. 1991; pp. 4085–4095.

T. Ninomiya, N. Matsumoto, T. Higashi, "Static and Dynamic Analysis of ZVS–PWM Half Bridge Converter", IEEE of Japan, Mag–90–82 (Technical Meeting on Magnetics) Mag–90–82 (in Japanese): Aug. 1990.

T. Ninomiya, N. Matsumoto, M. Nakahara, "Static and Dynamic Analysis of Zero–Voltage Switched Half–Bridge Converter with PWM Control", 1991 IEEE, pp. 230–237.

Paul Imbertson and Ned Mohan, "Asymmetrical Duty Cycle Permits Zero Switching Loss in PWM Circuits with no Conduction Loss Penalty", IEEE Transactions on Industry Applications, vol. 29, No. 1, Jan./Feb. 1993, pp. 121–125.
Ramesh Oruganti, Phua Chee Heng and Jeffrey Tan K.G., Liew A.C., "Soft–Switched DC/DC Converter with PWM Control", Power Conversion Topologies, pp. 341–349.
C. Peng, M. Hannigan, O. Seiersen, "A New Efficient High Frequency Rectifier Circuit", HFPC Jun. 1991 Proceedings, pp. 236–243.
Laszlo Balogh, "The Performance of the Current Doubler Rectifier with Synchronous Rectification", HFPC May 1995 Proceedings, pp. 216–225.
Ionel Dan Jitaru, "Zero Voltage PWM, Double Ended Converter", HFPC May 1992 Proceedings, pp. 394–405.
Laszlo Huber and Milan M. Jovanovic, "Forward Converter with Current–Double Rectifier: Analysis, Design, and Evaluation Results", 1997 IEEE, pp. 605–611.
Norbert Frohleke, Alfred Fiedler, Horst Grotstollen, "Investigation of PWM Controlled, Resonant Transition Converters with Asymmetrical Duty Cycle", 1995 IEEE, pp. 429–433.

*Primary Examiner*—Stuart N. Hecker

[57] ABSTRACT

An asymmetrical half-bridge converter, a method of operating the same and a power supply that incorporates either the converter or the method. In one embodiment, the converter includes: (1) a power transformer that receives AC input power into a primary winding thereof and transfers the AC input power into first and second secondary windings thereof, the first secondary winding having a secondary to primary turns-ratio smaller than the second secondary winding, (2) an auxiliary inductor coupled across the first and second secondary windings and (3) first and second rectifying diodes having inputs coupled to outer taps of the first and second secondary windings, an output of the converter derived from outputs of the first and second rectifying diodes and a center tap between the first and second secondary windings, an average current in the first secondary winding increased to cause the first and second secondary windings and the auxiliary inductor to share a DC bias current developed in the converter during an operation thereof.

20 Claims, 6 Drawing Sheets

5,877,945

ASYMMETRICAL HALF-BRIDGE CONVERTER HAVING DISTRIBUTED DC BIAS METHOD OF OPERATION THEREOF AND POWER SUPPLY EMPLOYING THE SAME

TECHNICAL FIELD OF THE INVENTION

The present invention is directed, in general, to power conversion and, more particularly, to an asymmetrical half-bridge converter that distributes DC bias generated therein among multiple magnetic devices, a method of operating such converter and a power supply employing the converter.

BACKGROUND OF THE INVENTION

Asymmetrical switching occurs when the two switches in a half-bridge power converter are turned on and off complementarily. In conventional switch-mode converters, the power switches are typically maintained in a conducting state for an equal duration during each half of the switching period. For one duty cycle, alternately one switch, then the other switch, conducts during successive half periods of the duty cycle for the same length of time with a corresponding dead time between each conduction time period. Asymmetrical half-bridge converters differ from the conventional switch-mode converters in that the switches conduct for unequal lengths of time with only a small deadtime between conduction periods.

An analysis of a zero-voltage-switching (ZVS) asymmetrical half-bridge converter with pulse-width-modulation (PWM) control is described, for example, in a paper entitled "Static and Dynamic Analysis of Zero-Voltage-Switched Half-Bridge Converter with PWM Control" by Tamotsu Ninomiya, et al., Proceedings of IEEE PESC '91, pp. 230–237 (1992); see also "Static and Dynamic Analysis of ZVS-PWM Half Bridge Converter" by T. Ninomiya, et al., IEE of Japan, MAG-90-82, August 1990, both of which are incorporated herein by reference. Ninomiya, et al., analyses a half-bridge converter with an asymmetrical PWM control scheme and demonstrates quantitatively the improvement of the control characteristics performed by the asymmetrical regulation of a pair of switches employed therein. Furthermore, Ninomiya, et al., teaches that the small deadtime between conducting periods in an asymmetrical converter circuit allows lossless commutation of the power switches.

Another asymmetrical half-bridge ZVS converter is described in, for example, U.S. Pat. No. 5,245,520, issued on Oct. 10, 1993, to Imbertson, entitled "Asymmetrical Duty Cycle Power Converter," which is incorporated herein by reference. Imbertson omits the resonant inductor described in Ninomiya's converter by utilizing the energy stored in the leakage inductance (or an auxiliary inductor) and the magnetizing inductance to reach ZVS. This practice is commonly used in designing ZVS full-bridge DC/DC converters and clamping-mode forward converters. This arrangement permits ZVS without introducing additional voltage and current stresses on the switches and the converter is suitable for high frequency applications.

An asymmetrical half-bridge converter, however, suffers from having a DC bias current in the converter's isolation transformer and a large ripple current component in the output of the converter. The output ripple current can be reduced or eliminated at the expense of increasing the DC bias current in the converter's transformer. The DC bias current necessitates that magnetic core of the isolation transformer be increased to prevent the transformer from saturating. Therefore, care must be taken when determining the size of the transformer to take into account the largest DC bias current that may be present. This inevitably results in an increase in the overall size, weight and cost of the converter.

Accordingly, what is needed in the art is an improved converter that mitigates the above-identified problems and, more particularly, there is a need for an improved converter wherein the isolation transformer is not burdened with all of the DC bias current generated in the converter.

SUMMARY OF THE INVENTION

To address the above-discussed deficiencies of the prior art, the present invention provides an asymmetrical half-bridge converter, a method of operating the same and a power supply that incorporates either the converter or the method. In one embodiment, the converter includes: (1) a power transformer that receives AC input power into a primary winding thereof and transfers the AC input power into first and second secondary windings thereof, the first secondary winding having a secondary to primary turns-ratio smaller than the second secondary winding, (2) an auxiliary inductor coupled across the first and second secondary windings and (3) first and second rectifying diodes having inputs coupled to outer taps of the first and second secondary windings, an output of the converter derived from outputs of the first and second rectifying diodes and a center tap between the first and second secondary windings, an average current in the first secondary winding increased to cause the first and second secondary windings and the auxiliary inductor to share a DC bias current developed in the converter during an operation thereof.

The present invention therefore introduces a new converter topology that spreads the DC bias current developed therein (by whatever cause) between at least two separate magnetic devices by redistributing the current, thereby allowing the transformer's magnetic capacity to be utilized significantly more efficiently.

In one embodiment of the present invention, the converter further includes first and second serially-coupled switches, coupled across an input voltage source, that are turned ON and OFF in a complementary manner to provide the AC input power. In an embodiment to be illustrated and described, the first and second switches are controllable metal-oxide semiconductor field-effect transistors (MOSFETs). Those skilled in the art will understand, however, that the present invention is not limited to a particular front-end switching topology.

In one embodiment of the present invention, a primary winding of the power transformer has a first tap coupled via a commutating inductor to a node between the first and second switches and a second tap coupled to the input voltage source via an input capacitor. Those skilled in the art are familiar with input capacitors and their use in converters.

In one embodiment of the present invention, the converter further includes an output capacitor coupled between the outputs of the first and second rectifying diodes and the center tap via an output capacitor.

In one embodiment of the present invention, the center tap bisects the first and second secondary windings, meaning that the number of turns in each of the first and second secondary windings portions is equal. Converter ripple can be reduced by varying the division of windings between the portions (without changing the total number of turns in the first and second secondary windings). Thus, in one embodiment to be illustrated and described, the "center" tap does not, in fact, bisect the first and second secondary windings.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
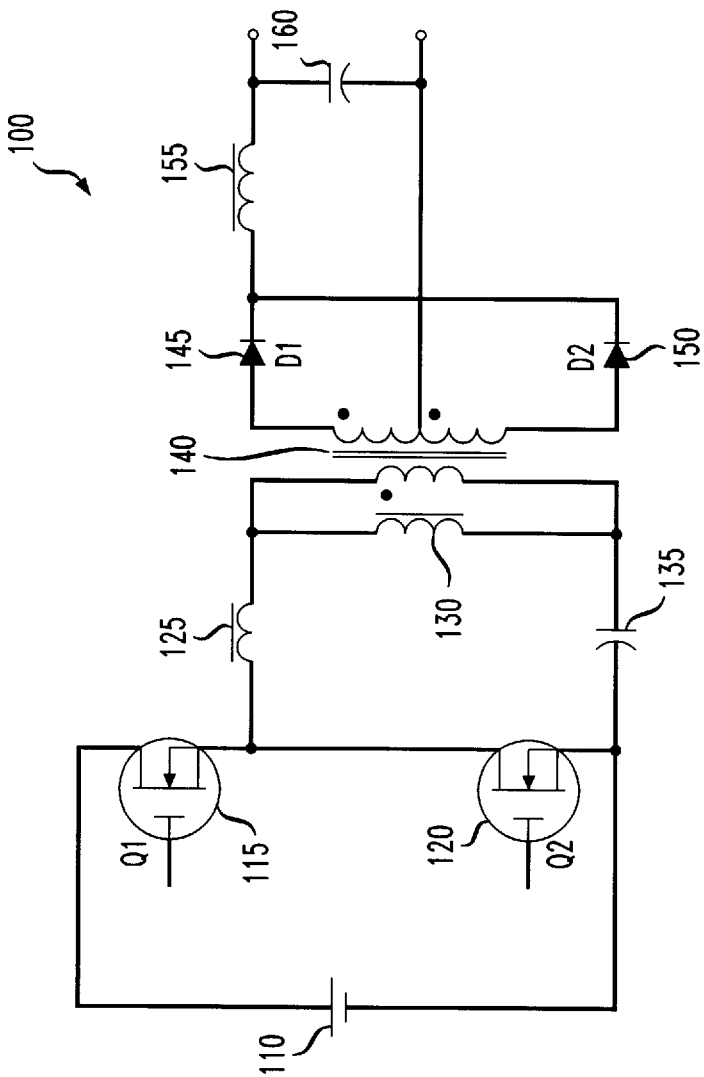
FIG. 1 illustrates a schematic diagram of a prior art asymmetrical ZVS half-bridge converter.

Referring initially to FIG. 1, illustrated is a schematic diagram of a prior art asymmetrical ZVS half-bridge converter 100. The asymmetrical ZVS half-bridge converter 100 includes an input voltage source 110 that is coupled to a first and a second switch 115, 120 (also referenced Q1, Q2, respectively). A commutating inductor 125 is coupled to both the first and second switches 115, 120 and to a terminal of the primary winding of a power transformer 140. The other terminal of the primary winding of the power transformer 140 is coupled to one terminal of an input capacitor 135. The other terminal of the input capacitor 135 is coupled to the second switch 120 and to the return of the input voltage source 110. A magnetizing inductor 130 is the magnetizing inductance of the power transformer 140. Also shown is a first rectifying diode 145 (also referenced D1) and a second rectifying diode 150 (also referenced D2) that are coupled to the first and second secondary windings of the power transformer 140. The first and second rectifying diodes 145, 150 are also coupled to an output filter inductor 155 that is coupled to an output capacitor 160.

The first and second switches 115, 120 (e.g., transistors) are operated with an asymmetrical duty cycle (i.e., the first switch 115 is conducting for a time period of D and the second switch 120 is conducting for a time period of (1−D) with a small deadtime between conducting periods). The first and second switches 115, 120 convert the input voltage 110, typically a DC voltage, into a square wave AC voltage that can be transferred across the power transformer 140. The time period D, or duty cycle, controls the gain (i.e., $V_{out}/V_{in}$) of the asymmetrical half-bridge ZVS converter 100 allowing the output voltage $V_{out}$ to be kept constant when the input voltage $V_{in}$, changes. The commutating inductor 125 including a leakage inductance of the power transformer 140 and any additional inductances placed in series with the primary winding of the power transformer 140 provides the energy required to charge and discharge the parasitic capacitances of the first and second switches 115, 120. The parasitic capacitances of the first and second switches 115, 120 and the commutating inductor 125 form a LC resonant tank circuit allowing the first and second switches 115, 120 to switch ON and OFF in a lossless manner. The power transformer 140 transfers electrical energy from the input bridge (i.e., the first and second switches 115, 120) to the output rectifying and filtering circuit. The first and second rectifying diodes 145, 150 rectify the AC output of the power transformer 140 and pass the unidirectional, but not "pure," DC voltage to a low pass output filter (e.g., the output filter inductor 155 and the output capacitor 160). The low pass filter smooths and filters the rectified square-edged pulses to produce a substantially pure DC output voltage.

The prior art asymmetrical half-bridge ZVS converter 100 exhibits the desirable features of other converter topologies (e.g., switch-mode, resonant-pole and resonant), such as low conduction losses and lossless switching. However, the asymmetrical duty cycles of the first and second switches 115, 120 introduce a DC bias current in the first and second secondary windings of the power transformer 140, because of the unequal conducting periods of the switches. The existence of the DC bias current requires energy storage in the transformer. To accommodate the energy storage requirement, the magnetizing inductor 130 should be made relatively small and a larger magnetic core should be provide to avoid saturation, thus preventing efficient utilization of the transformer's magnetic capacity.

Figure 2:
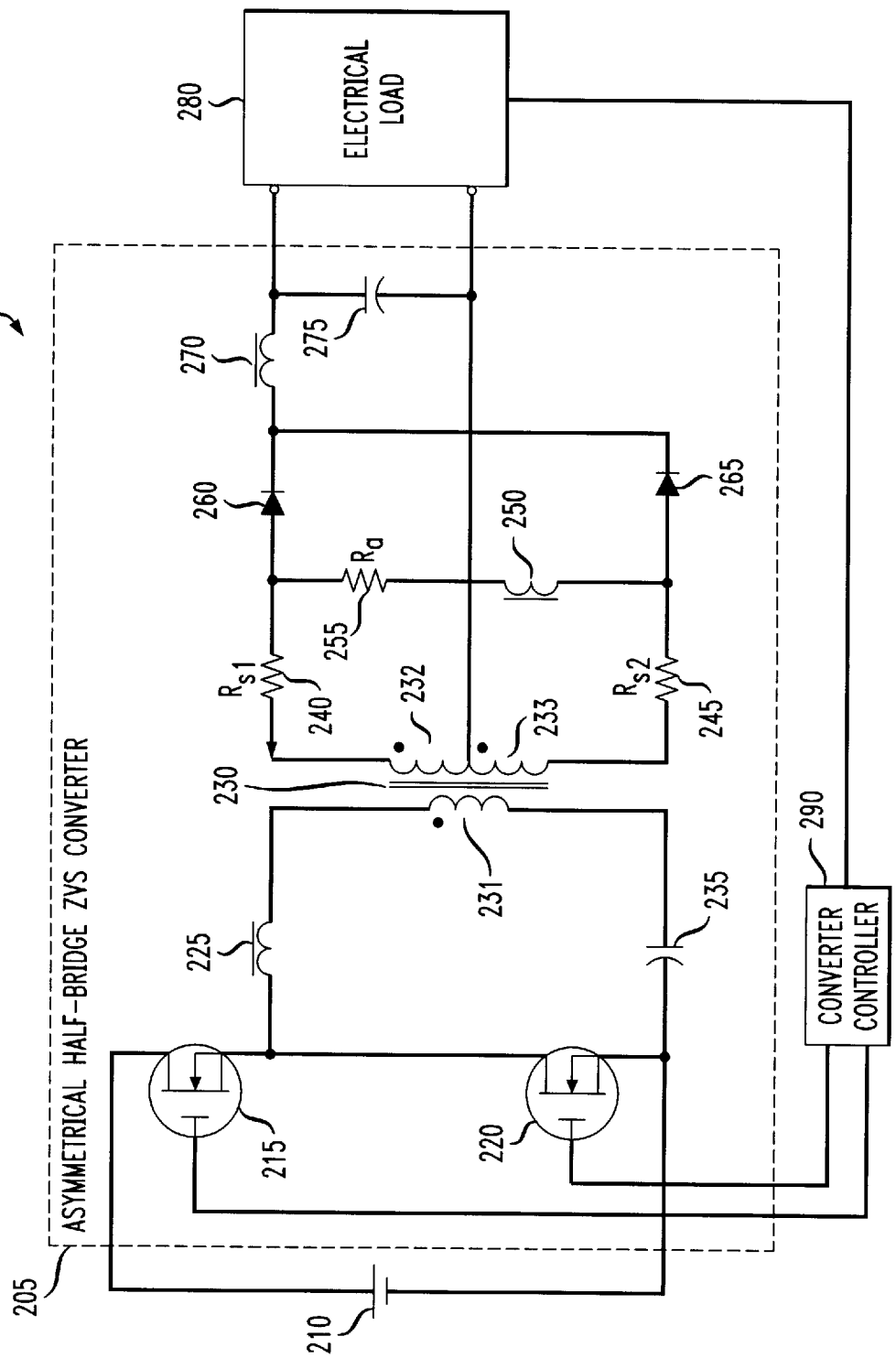
FIG. 2 illustrates a schematic diagram of a power supply employing an asymmetrical half-bridge ZVS converter constructed according to the principles of the present invention.

Turning now to FIG. 2, illustrated is a schematic diagram of a power supply 200 employing an asymmetrical half-bridge ZVS converter 205 constructed according to the principles of the present invention. The power supply 200 includes a power train (including the asymmetrical half-bridge ZVS converter 205) that receives power from an input voltage source 210 (e.g., a DC voltage source) and converts the input voltage to a desired output voltage to power an electrical load 280. The power supply 200 also includes a converter controller 290. The input voltage source 210 is coupled to the asymmetrical half-bridge ZVS converter 205 and, more particularly, to first and second switches 215, 220 and to a second tap (shown, but not referenced) of a primary winding 231 of a power transformer 230 through an input capacitor 235. A commutating inductor 225 is coupled to both the first and second switches 215, 220 and to a first tap (shown, but not referenced) of the primary winding 231.

Also shown are first and second secondary windings 232, 233 of the power transformer 230 that are coupled to first and second rectifying diodes 260, 265, respectively. An auxiliary inductor 250 with its auxiliary parasitic resistance 255, referenced as $R_a$, are coupled in parallel with the first and second secondary windings 232, 233 and their first and second parasitic resistances 240, 245, referenced as $R_{s1}$ and $R_{s2}$, respectively. The parasitic resistances of the auxiliary inductor 250, first secondary winding 232 and second secondary winding 233 may also include resistances that are not integral (i.e., external) to the auxiliary inductor 250, first secondary winding 232 and second secondary winding 233. The first and second rectifying diodes 260, 265 are also coupled to an output inductor 270 that, in turn, is coupled to an output capacitor 275. The output capacitor 275 is coupled in parallel across the electrical load 280 coupled, in turn, to the converter controller 290. The output capacitor 275 is also coupled to a center tap (shown, but not referenced) between the first and second secondary windings 232, 233. In the illustrated embodiment, the converter controller 290 provides a pulse width modulation (PWM) switching pattern having an asymmetrical duty cycle to control the first and second switches 215, 220.

For steady-state analysis of the asymmetrical half-bridge ZVS converter 205, the output inductor 270 is assumed to be large enough that the current through it may be considered constant. Additionally, the capacitance of the input capacitor 235 is also assumed to be relatively large, so that the input capacitor 235 may be considered a voltage source over a switching cycle with a DC voltage of $DV_{in}$. The steady-state equations are summarized below in Table 1 where $N_s$ is the total number of turns of secondary windings and $N_p$ is the number of turns of the primary winding.

TABLE 1

Steady-State Equations

| Component | Prior Art Converter | Converter of the Present Invention |
|---|---|---|
| Switch Q1 | $V_{ds1} = V_{in}$ | Same |
| | $I_{Q1rms} = \sqrt{D} \cdot I_{Q1p}$ | |
| | $I_{Q1p} = \dfrac{I_o \cdot N_s}{N_p} (1 - D)$ | |
| Switch Q2 | $V_{ds2} = V_{in}$ | Same |
| | $I_{Q2rms} = \sqrt{1 - D} \cdot I_{Q2p}$ | |
| | $I_{Q2p} = \dfrac{I_o \cdot N_s}{N_p} D$ | |
| Rectifier Diode D1 | $V_{d1} = \dfrac{N_s}{N_p} D \cdot V_{in}$ | Same |
| | $I_{d1ave} = I_o D$ | |
| Rectifier Diode D2 | $V_{d2} = \dfrac{N_s}{N_p} (1 - D) V_{in}$ | Same |
| | $I_{d2ave} = I_o (1 - D)$ | |

The equations in Table 1, illustrate that the voltage and current stresses on the switches and rectifying diodes are the same for both converter topologies and that the present invention also provides lossless switching and low conduction losses.

The output ripple current of the asymmetrical half-bridge ZVS converter 205 is given by the following:

$$\Delta I_o = \frac{N_s}{N_p} \frac{D(1-D)V_{in}}{f_s L_o} \left( \frac{N_{s1}}{N_s} - D \right) \quad (1)$$

where $N_s$ is the total number of turns of the first and second secondary windings, $N_{s1}$ is the number of turns of the first secondary winding 232, $f_s$ is the switching frequency and $L_o$ is the output inductor 270 inductance. Equation (1) illustrates that the output ripple current may be canceled at $D=N_{s1}/N_s$ and that the output ripple current may be reduced over a range of duty ratios.

Figure 3:
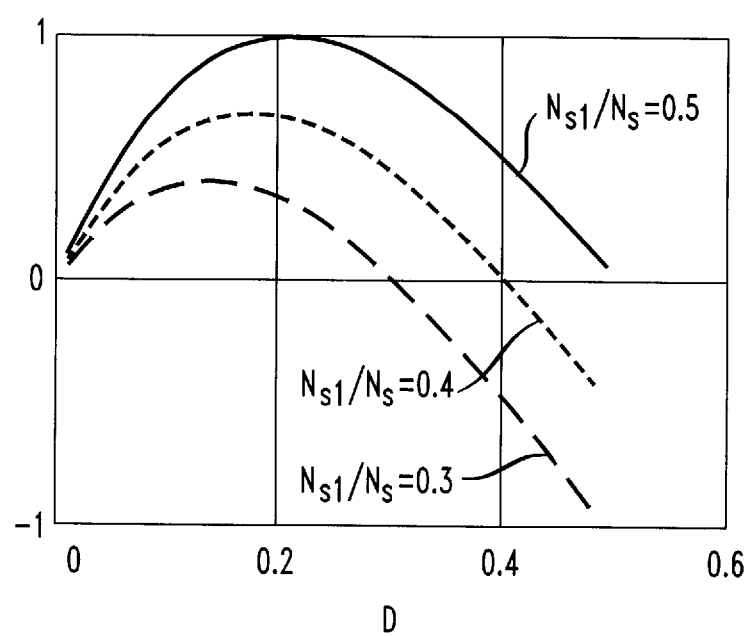
FIG. 3 illustrates a graph of the normalized output ripple current over a range of duty ratios for different values of $N_{s1}/N_s$.

Turning now to FIG. 3, illustrated is a graph of the normalized output ripple current over a range of duty ratios for different values of $N_{s1}/N_s$. FIG. 3 illustrates that the output ripple current is reduced over the entire duty ratio range (0 to 0.5) with $N_{s1}/N_s=0.4$ and reducing $N_{s1}/N_s<0.4$ results in lower output ripple current at smaller duty ratios.

The smaller output ripple current allows a smaller output inductor 270 and/or output capacitor 275 to be employed. However, the reduction of the output ripple current also increases the DC bias current in the power transformer 230. The additional DC bias current is introduced by the asymmetrical turns ratios of the first and second secondary windings 232, 233 ($N_{s1}/N_s$ and $N_{s2}/N_s$, respectively, where $N_{s2}=N_s-N_{s1}$). The DC bias current may be minimized with the introduction of the auxiliary inductor 250 and the first, second and auxiliary parasitic resistances 240, 245, 255. The DC bias current of the auxiliary inductor 250 ($\overline{IL_a}$) is:

$$\overline{IL_a} = I_o \frac{R_{s2}(1 - D) - R_{s1}D}{R_{s1} + R_{s2} + R_a} \quad (2)$$

and:

$$\overline{I_s} = (1 - 2D)I_o - 2I_a\overline{IL_a} \quad (3)$$

where $\overline{I_s}$ is the total DC bias current in the power transformer 230. Equation (3) demonstrates that the DC bias current in the power transformer 230 can be reduced if $\overline{I_s}$ is not equal to zero.

Turning now to FIGS. 4A, 4B, 4C and 4D, illustrated are normalized DC bias currents in the primary and first and second secondary windings of a power transformer. Selecting $R_{s1}=R_{s2}$ and $N_{s1}=N_{s2}$, equation (2) above reduces to:

$$\overline{IL_a} = I_o \frac{1 - 2D}{2 + \dfrac{R_a}{R_{s1}}} \quad (4)$$

and the DC bias current reflected to the primary side of the transformer is:

$$\overline{I_p} = \left( 1 - \frac{N_{s1}}{N_p} \right)(1 - D)I_o - \frac{N_{s1}}{N_p} DI_o - \frac{N_a}{N_p} \overline{IL_a} \quad (5)$$

Figure 4A:
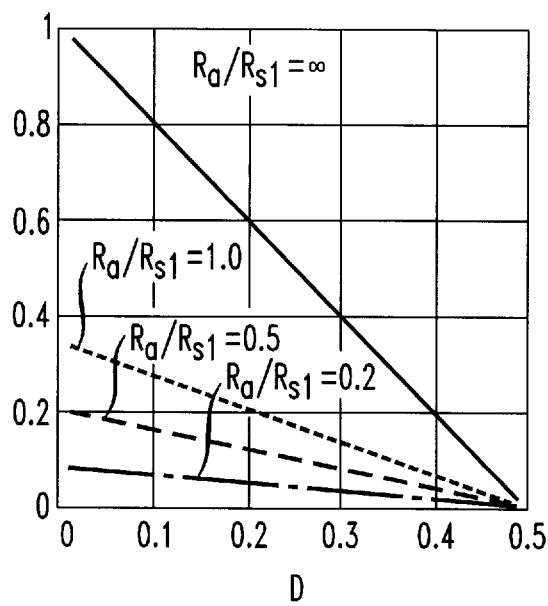
FIGS. 4A, 4B, 4C and 4D illustrate normalized DC bias currents in the primary and first and second secondary windings of a power transformer.
Figure 4B:
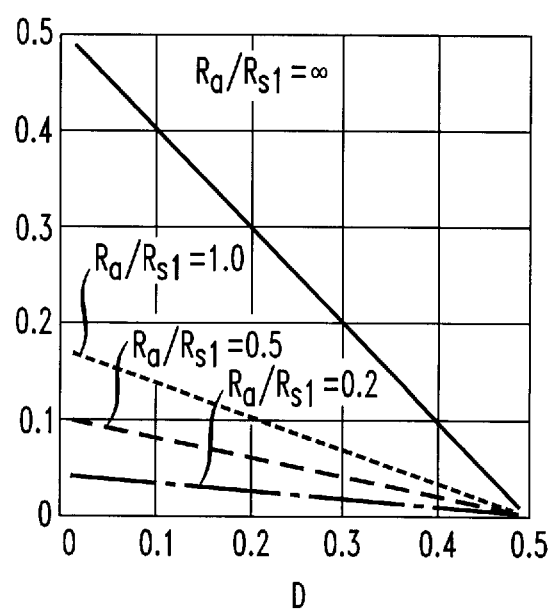

FIG. 4A and FIG. 4B depict the normalized DC bias currents in the first and second secondary and primary windings, respectively, of a power transformer for different $R_a/R_{s1}$ values ($R_{s1}=R_{s2}$ and $N_{s1}=N_{s2}$). It should be noted that the smaller the value of $R_a/R_{s1}$, the smaller is the DC bias current and that the relative reduction of the DC bias current in the power transformer is independent of the duty ratio (D). Under these conditions, however, there is no output ripple cancellation.

Figure 4C:
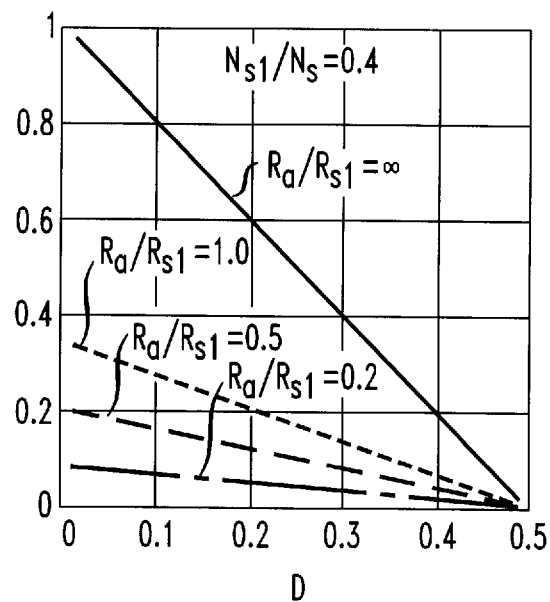
Figure 4D:
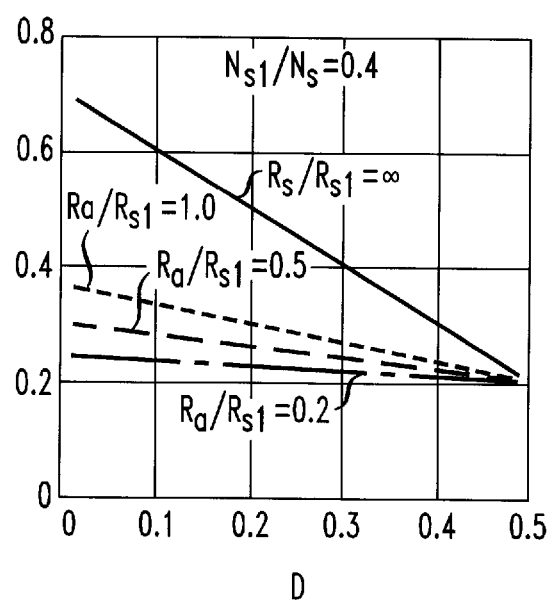

As described previously, output ripple current may be minimized by selecting $N_{s1}/N_s=D$. FIGS. 4C and 4D depict the normalized DC bias currents in the secondary and primary windings, respectively, of a power transformer for different $R_a/R_{s1}$ values with $R_{s1}=R_{s2}$, $N_{s1}<N_{s2}$, $N_s=N_{s1}+N_{s2}$ (unchanged) and $N_{s1}/N_s=D$. As FIGS. 4C and 4D illustrate, not only may the DC bias current introduced by the asymmetrical duty ratio be minimized by lowering the ratio of $R_a/R_{s1}$, but also the DC bias contribution from the asymmetrical turns-ratio of the power transformer may be reduced.

The output current does not consist solely of the currents from the first and second secondary windings after the introduction of the auxiliary inductor. The auxiliary inductor DC bias current component travels through the first and second secondary windings, increasing the amplitude of the current in the first secondary winding and decreasing the amplitude of the current in the second secondary winding.

Under the following conditions, $R_{s1}<R_{s2}$, $N_{s1}<N_{s2}$ and $N_s=N_{s1}+N_{s2}$ (unchanged), the equation for the DC bias current in the auxiliary inductor (equation (2), above) becomes:

$$\overline{IL_a} = \frac{\frac{R_{s2}}{R_{s1}}(1-D) - D}{1 + \frac{R_{s2}}{R_{s1}} + \frac{R_a}{R_{s1}}} \quad (6)$$

However, equations (3) and (5) are still valid. To minimize the DC bias current in the primary side resulting from the asymmetrical turns-ratio, the average current in the secondary winding having the smaller secondary to primary turns-ratio should be increased. The parasitic resistance of the secondary winding having the smaller secondary to primary turns-ratio, however, should be selected with a value smaller than the other secondary winding parasitic resistance. The reduction in the DC bias currents in both the primary and first and second secondary windings may be illustrated by referring to FIGS. 5A and 5B.

Figure 5A:
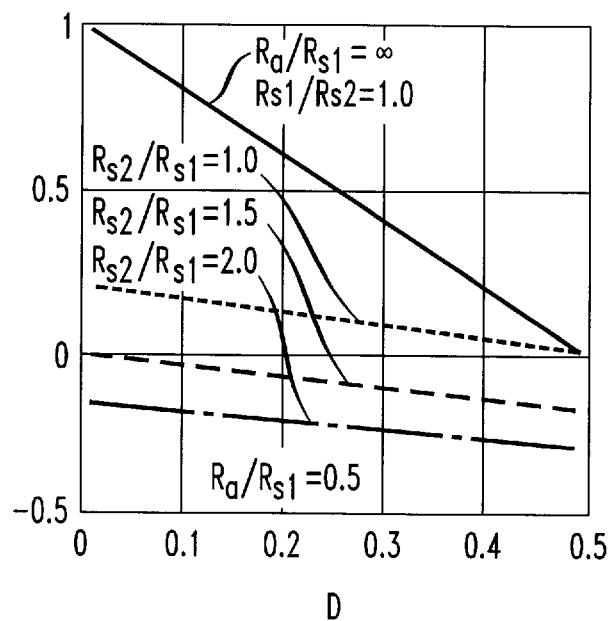
FIGS. 5A and 5B illustrate normalized DC bias currents in the first and second secondary and primary windings, respectively, of a power transformer for different $R_a/R_{a1}$ values with $N_{s1}/N_s=0.4$ and $R_a/R_{s1}=0.5$.
Figure 5B:
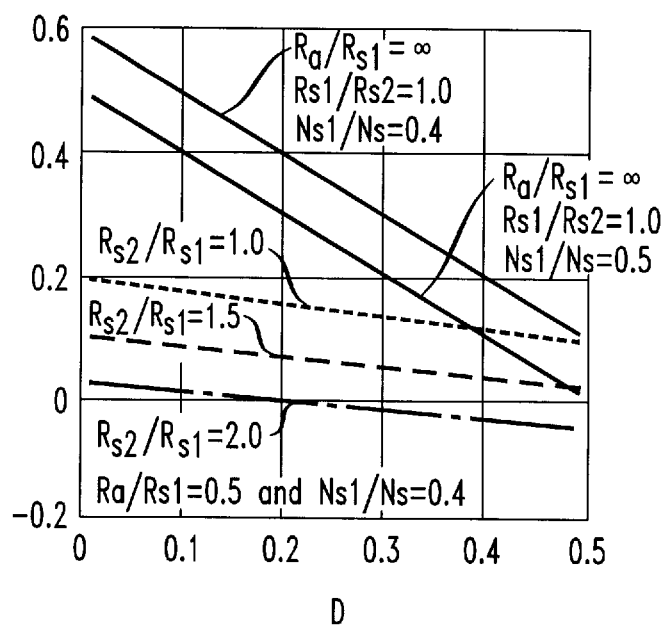

Turning now to FIGS. 5A and 5B, illustrated are normalized DC bias currents in the secondary and primary windings, respectively, of a power transformer for different $R_a/R_{s1}$ values with $N_{s1}/N_s = 0.4$ and $R_a/R_{s1} = 0.5$. FIGS. 5A and 5B illustrate that the DC bias currents, in both the primary and first and second secondary windings, can be made bidirectional. More importantly, the DC bias currents may be eliminated with the output ripple current also reduced to substantially zero at a particular duty ratio.

The addition of the auxiliary inductor and the appropriate selection of the parasitic resistances as described above allows a significant portion of the DC bias current in the power transformer to be transferred to the auxiliary inductor. The transference of the DC bias current to the auxiliary inductor not only reduces the DC bias current in the power transformer, but also minimizes the energy stored in the auxiliary and output inductors. The total volume of magnetic materials used in the converter of the present invention is substantially smaller than the volume of magnetic materials used in a conventional converter.

From the above, it is apparent that the present invention provides an asymmetrical half-bridge converter, a method of operating the same and a power supply that incorporates either the converter or the method. The converter includes: (1) a power transformer that receives AC input power into a primary winding thereof and transfers the AC input power into first and second secondary windings thereof, the first secondary winding having a secondary to primary turns-ratio smaller than the second secondary winding, (2) an auxiliary inductor coupled across the first and second secondary windings and (3) first and second rectifying diodes having inputs coupled to outer taps of the first and second secondary windings, an output of the converter derived from outputs of the first and second rectifying diodes and a center tap between the first and second secondary windings, an average current in the first secondary winding increased to cause the first and second secondary windings and the auxiliary inductor to share a DC bias developed in the converter during an operation thereof. The present invention introduces a new converter topology that spreads the DC bias developed therein (by whatever cause) between at least two separate magnetic devices by redistributing current, thereby allowing the transformer's magnetic capacity to be utilized significantly more efficiently.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa. Similarly, although a magnetic device having a single core and a single primary winding has been illustrated, other configurations, such as magnetic devices having multiple primary windings or multiple cores, may be used to accomplish essentially the same results disclosed by the present invention.

Although the present invention has been described in detail, those skilled in the art should understand that they can make various changes, substitutions and alterations herein without departing from the spirit and scope of the invention in its broadest form.

What is claimed is:

1. An asymmetrical half-bridge converter, comprising:

a power transformer that receives AC input power into a primary winding thereof and transfers said AC input power into first and second secondary windings thereof, said first secondary winding having a secondary to primary turns-ratio smaller than said second secondary winding;

an auxiliary inductor coupled across said first and second secondary windings; and first and second rectifying diodes having inputs coupled to outer taps of said first and second secondary windings, an output of said converter derived from outputs of said first and second rectifying diodes and a center tap between said first and second secondary windings, an average current in said first secondary winding increased to cause said first and second secondary windings and said auxiliary inductor to share a DC bias developed in said converter during an operation thereof.

2. The converter as recited in claim 1 further comprising first and second serially-coupled switches, coupled across an input power source, that toggle to provide said AC input power.

3. The converter as recited in claim 2 wherein a primary winding of said power transformer has a first tap coupled via a commutating inductor to a node between said first and second switches and a second tap coupled to said input power source.

4. The converter as recited in claim 1 wherein a primary winding of said power transformer has a second tap coupled to an input power source via an input capacitor.

5. The converter as recited in claim 1 further comprising an output capacitor coupled between said outputs of said first and second rectifying diodes and said center tap.

6. The converter as recited in claim 1 further comprising a magnetizing inductor coupled across said primary winding of said power transformer.

7. The converter as recited in claim 1 wherein said center tap bisects said first and second secondary windings.

8. A method of operating an asymmetrical half-bridge converter, comprising the steps of:

receiving AC input power into a primary winding of a power transformer, said power transformer transferring said AC input power into first and second secondary windings, said first secondary winding having a secondary to primary turns-ratio smaller than said second secondary winding;

processing at least a portion of said AC input power in an auxiliary inductor coupled across said first and second secondary windings; and deriving an output of said converter from outputs of first and second rectifying diodes having inputs coupled to outer taps of said first and second secondary windings and a center tap between said first and second secondary windings, an average current in said first secondary winding increased to cause said first and second secondary windings and said auxiliary inductor to share a DC bias developed in said converter during an operation thereof.

9. The method as recited in claim 8 further comprising the step of providing said AC input power with first and second serially-coupled switches coupled across an input power source.

10. The method as recited in claim 9 wherein a primary winding of said power transformer has a first tap coupled via a commutating inductor to a node between said first and second switches and a second tap coupled to said input power source.

11. The method as recited in claim 8 wherein a primary winding of said power transformer has a second tap coupled to an input power source via an input capacitor.

12. The method as recited in claim 8 further comprising the step of processing said power with an output capacitor coupled between said outputs of said first and second rectifying diodes and said center tap.

13. The method as recited in claim 8 further comprising the step of processing said power with a magnetizing inductor coupled across said primary winding of said power transformer.

14. The method as recited in claim 8 wherein said center tap bisects said first and second secondary windings.

15. A power supply, comprising:
  a power train that receives input power from an input power source and converts said input power to provide output power to an electrical load, said power train containing an asymmetrical half-bridge converter, including:
    a power transformer that receives AC input power into a primary winding thereof and transfers said AC input power into first and second secondary windings thereof, said first secondary winding having a secondary to primary turns-ratio smaller than said second secondary winding,
    an auxiliary inductor coupled across said first and second secondary windings, and
    first and second rectifying diodes having inputs coupled to outer taps of said first and second secondary windings, an output of said converter derived from outputs of said first and second rectifying diodes and a center tap between said first and second secondary windings, an average current in said first secondary winding increased to cause said first and second secondary windings and said auxiliary inductor to share a DC bias developed in said converter during an operation thereof; and
  a converter controller, coupled to control inputs of said first and second switches, that applies a pulse width modulation (PWM) switching pattern having an asymmetrical duty cycle to said first and second switches.

16. The power supply as recited in claim 15 wherein said converter controller applies said PWM switching pattern to said first and second switches to cause said converter to operate in a zero-voltage switching mode.

17. The power supply as recited in claim 15 wherein said converter further includes an output capacitor coupled between said outputs of said first and second rectifying diodes and said center tap.

18. The power supply as recited in claim 15 wherein said converter further includes a magnetizing inductor coupled across said primary winding of said power transformer.

19. The power supply as recited in claim 15 wherein said center tap bisects said first and second secondary windings.

20. The power supply as recited in claim 15 wherein said first and second secondary windings and said auxiliary inductor have parasitic resistances associated therewith, said parasitic resistances employed to increase said average current in said first secondary winding.

\* \* \* \* \*